3,283,016
NITROGEN CONTAINING INDAN DERIVATIVES
Thomas F. Wood, Wayne, and John T. Angiolini, Clifton, N.J., assignors to The Givaudan Corporation, New York, N.Y., a corporation of New Jersey
No Drawing. Filed Sept. 28, 1964, Ser. No. 399,901
6 Claims. (Cl. 260—645)

This invention relates to novel and useful nitrogen-containing indan compounds and methods for their preparation.

An object of this invention is the provision of a novel class of compounds having various uses in the arts.

A specific object of this invention is the provision of compounds having effective and superior properties as herbicides.

A further object of the present invention is to provide a process for easily making the novel compounds of this invention in an inexpensive manner from low-cost and readily-available materials.

The foregoing and other objects of this invention have been attained by providing compounds which are members of the group encompassed by the following general formula:

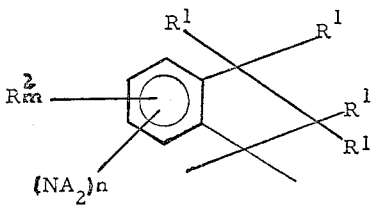

wherein $R^1$ is a member selected from the group consisting of H and alkyl radicals having from 1 to 3 carbon atoms; $R^2$ is a member selected from the group consisting of alkyl radicals having from 1 to 5 carbon atoms and cycloalkyl radicals; A is a member selected from the group consisting of O and H; $m$ is an integer from 2 to 3; $n$ is an integer from 1 to 2, with the proviso that at least one $R^1$ must be H and the further proviso that where more than two of the $R^1$'s are H, then $m$ can be an integer from 1 to 3; 4,6 - dinitro - 2 - ethyl - 1,1,3,3,5 - pentamethylindan and 4,6 - dinitro - 5 - ethyl 1,1,3,3 - tetramethylindan.

Examples of compounds coming within the scope of this invention are the following:

5,7-dinitro-1,1-dimethyl-6-isopropylindan
5,7-diamino-1,1-dimethyl-6-isopropylindan
5-amino-1,1-dimethyl-6-isopropyl-7-nitroindan or 7-amino-1,1-dimethyl-6-isopropyl-5-nitroindan
5,6-dinitro-7-isopropyl-1,1,4-trimethylindan
5,6-dinitro-7-isopropyl-1,1,2,4-tetramethylindan
5,6-diamino-7-isopropyl-1,1,4-trimethylindan
5,7-dinitro-1,1,4,6-tetramethylindan
5,6-dinitro-1,1,4,7-tetramethylindan
1,1-dimethyl-5,7-dinitro-6-ethylindan
5,7-dinitro-1,1,2,4,6-pentamethylindan
6-t-butyl-1,1-dimethyl-5,7-dinitroindan
6-sec. butyl-1,1-dimethyl-5,7-dinitroindan
1,1-dimethyl-5,6-dinitro-4-ethyl-7-isopropylindan
4,6-diisopropyl-1,1-dimethyl-5,7-dinitroindan
5-t-butyl-4,6-dinitro-1,1-dimethyl-7-isopropylindan
5 (and 7)-nitro-1,1,4,6-tetramethylindan
1,1-dimethyl-6-isopropyl-5-(and 7) nitroindan
5-nitro-1,1,4,6,7-pentamethylindan
7-isopropyl-5-nitro-1,1,4-trimethylindan
5-ethyl-6-nitro-1,1,3,3-tetramethylindan
4,6-diisopropyl-1,1-dimethyl-5-nitroindan
4,6-dinitro-5-ethyl-1,1,3,3-tetramethylindan
4,6-dinitro-2-ethyl-1,1,3,3,5-pentamethylindan The nitrogen-containing indan derivatives disclosed herein are pale yellow to orange colored solids and in some cases pale yellow viscous liquids which have low vapor pressure, are free of objectionable odor, and are readily soluble in the organic solvents commonly used for dissolving herbicidal materials. They are readily purified by crystallizing from alcoholic solutions or from aqueous alcoholic solutions and in some cases by vacuum-distillation.

It has been found that the compounds of this invention are useful for various purposes. Some of the compounds have properties making them suitable for use in perfumery, e.g., as musk odorants. Surprisingly, our compounds have been found to possess properties making them suitable as superior, selective, herbicides, particularly on a pre-emergence basis, and as plant growth regulants. The utility of our compounds is enhanced by the fact that, as contrasted to known commercially available herbicides, they do not have objectionable odors, are non-irritating to the skin and have very low toxicity.

The term "pre-emergence" means that the compounds are applied, in known manner, to the soil prior to emergence of the weed species sought to be controlled. As used herein, the term includes the application of a herbicidal compound falling within the scope of this disclosure to areas wherein useful or desirable plants are either growing or have been sown, but where the undesirable plants sought to be controlled have not as yet emerged.

The herbicidal activity of the compounds of the present invention is demonstrated by the following tests. Seeds selected from at least two types of common weed varieties such as wild oats, cheatgrass, foxtail, barnyard grass, crabgrass, nut grass, Johnson grass, curled dock, yellow rocket, chickweed, pigweed, velvet leaf and lambsquarter were planted in soil under greenhouse conditions. Immediately after planting, the soil surface was sprayed with aqueous suspensions of these compounds so as to supply the equivalent of 16 lbs. of the compound under test per acre of soil surface. The aqueous suspensions were produced by stirring acetone and/or alcohol solutions of these compounds into water. Three weeks after spray application the herbicidal activity of these compounds was determined in comparison with untreated control areas.

All of the compounds exhibit beneficial pre-emergence herbicidal activity against noxious weeds and grasses; some inhibit germination of only certain weed and grass species; others exhibit a broader spectrum of inhibition. In other words, a high degree of selectivity is shown by this family. For this reason these compounds are of great value in the elimination of weeds and grasses from economic crops such as corn, beans, soybeans, rice and others; some individual members being especially effective in certain specific crops.

The nitro and amino derivatives of this invention are conveniently and economically prepared from the parent alkylindan hydrocarbons. Nitration using more or less standard techniques will produce the mono- or dinitro-derivatives as desired.

Complete or partial reduction of the nitro derivatives will produce the corresponding monoamino, diamino or nitroamino derivatives as the case may be. In many cases, the parent hydrocarbon may be mainly converted to the dinitroderivative by treatment with a great molar excess of fuming (98%) nitric acid alone. However, by this method considerable oxidation often occurs as a side reaction resulting in lowered yields and may lead to excessive coloration in the product. We prefer to prepare dinitroderivatives by adding one mole of the hydrocarbon slowly with good agitation to a mixed acid composed of 5.5 to 6 moles of 98% nitric acid and 9.5 to 11.0 moles of 93% sulfuric acid while cooling to maintain a reaction temperature of −20° to 25°, preferably 0 to 18°. The molar ratios of the mixed acids may be varied considerably in the process but appreciable reduction of the nitric acid will lead to substantial amounts of mononitroderivative which naturally gives a reduced yield of dinitroderivative. Increasing the nitric acid above the recommended 6 moles offers no advantage and results in unnecessary waste of the acid. The sulfuric acid concentration may be varied but decreased amounts will result in lower yields and greater amounts offer no appreciable advantages and waste the excess acid.

For preparation of mononitroderivatives it is possible to modify the nitration process by reducing the nitric acid at least one-half and using sulfuric acid of lesser strength than 93%, such as 75 to 85% and get fair yield of the mononitroderivatives. However, in order to get substantially quantitative yields of the mononitroderivatives we prefer to use the procedure developed several years ago by Carpenter et al. (J. Org. Chem., 16, 603 (1951)). Here nitric acid (2.5 moles, 98%) is added to a solution of 8 moles of acetic acid and 4 moles of acetic anhydride, keeping the temperature below 20°. The hydrocarbon, either alone or dissolved in part of the acetic acid, is added at temperatures varying from −30 to +30°, preferably from −10 to +20°.

In all cases upon completion of the nitration the reaction mixture is quenched in ice, and the product taken up in benzene, washed with water, then with 5% sodium hydroxide until the washes are free of color, then with water to neutrality and the solvent removed. The remaining crude product is then crystallized from an appropriate solvent.

In cases where the corresponding amino- or diamino derivatives are desired the reductions can be effected by the well-known procedures of reduction with iron filings and dilute acid, hydrogenation catalyzed by Raney nickel, or hydrogenation catalyzed by palladium on carbon. We prefer the latter reduction method since this results in excellent yields with a minimum of by-products.

For conversion of dinitroderivatives to aminonitro compounds we use the well-known reaction which employs sodium sulfide or sulfhydrate in aqueous or aqueous alcoholic solutions at reflux temperature to selectively reduce one of the nitro groups to amino group.

The parent indan hydrocarbons required for the preparation of the compounds of this invention are readily prepared by the many procedures recorded in the chemical literature.

The procedures most commonly employed are the following:

1. *Di- and tri-alkylation of indans.*—Direct polyalkylation of indan can be carried out in the conventional manner using regular Friedel-Crafts catalysts or protonic acid alkylation catalysts (e.g. $H_2F_2$, $H_3PO_3$, $H_2SO_4$). For example 4,5,6-tri-isopropyl indan 4,5,6-tri-cyclohexylindan, di-sec. butylindan and di-cyclohexylindan are prepared by the procedure of Pokrovskaya and coworkers. E. S. Pokrovskaya and T. G. Stepantseva, J. Gen. Chem., U.S.S.R., 9, 1953 (1939); ibid., Tr. Inst. Nefti, Akad. Nauk S.S.S.R., 1, No. 2,300 (1950). E. S. Pokrovskaya and R. Y. Sushchik, J. Gen. Chem. U.S.S.R., 9, 2291 (1939); Patinkin, S. H. and B. S. Friedman, Friedel-Crafts and Related Reactions, vol. II, Part I, Interscience Publishers, New York, pages 72–3 (1964).

2. *Reduction of 1-indanones.*—This general reaction for the preparation of indans is carried out as follows:

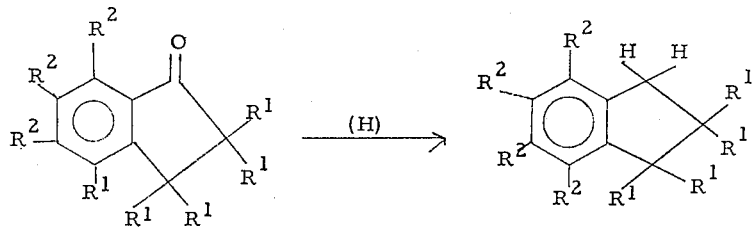

The reduction may be carried out by the following methods:

(a) Reduction by zinc and hydrochloric acid (Clemmensen).

(b) Reduction by hydrazine in the presence of a base (Wolff-Kishner). For example see Ferrero and Helg., Chim. Acta, 42, 2111 (1959).

(c) Catalytic hydrogenation.

The methods of reducing carbonyls are well-known procedures familiar to chemists skilled in the art and need not be discussed further.

The 1-indanones required are readily obtained by the procedures previously reported in the literature.

The combination acylation-alkylation procedure of Hart and Tebbe, J. Am. Chem. Soc., 72, 3286 (1950) results in 1-indanone derivatives of the types needed. For example from p-xylene there is obtained:

4,7-dimethyl-1-indanone, 2,4,7-trimethyl-1-indanone, 3,4,7-trimethyl-1-indanone, etc.

Similarly many other homologs may be prepared starting with other di- or tri-substituted benzenes using many different cyclialkylation agents. J. Colonge and L. Pichat, Bull. Soc. Chim., 1949, 423, describe the preparation of 3,3,5,7-tetramethyl-1-indanone from metaxylene and dimethylacrylic acid.

3. Cyclodehydration method:

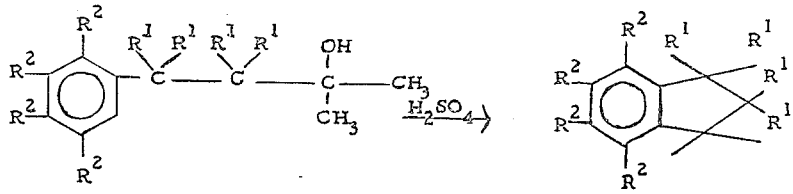

This method is the most versatile of all for the preparation of substituted indans. It was first extensively investigated by R. O. Roblin, Jr., D. Davidson and M. T. Bogert, J. Am. Chem. Soc., 57, 152 (1935), who prepared 1-methyl-1-ethylindan, 1,1,2-trimethylindan, 1,1-dimethylindan, 1,1,3-trimethylindan and 1,1,3,3-tetra-methylindan. Since this early work the method has been extensively used by others. For example, L. I. Smith and L. J. Spillane (J. Am. Chem. Soc., 65,207 (1043), prepared 1,1,3,3,4,6-hexamethylindan by the cyclo-dehydration technique. Weber and co-workers have synthesized 1,1,3,5-tetramethyl - 3 - n-propylindan and 1,1,3,5-tetramethyl-3-isobutylindan.

4. *Cyclo-addition of olefins to styrenes.*—This general method for the preparation of polyalkylated indans by reaction of styrenes and olefins in the presence of sulfuric acid was disclosed in U.S. Patent 2,851,501.

Polyalkylindans useful for preparing acyl derivatives of herbicidal value may be similarly obtained by employing suitable substituted styrenes and olefins: For example:

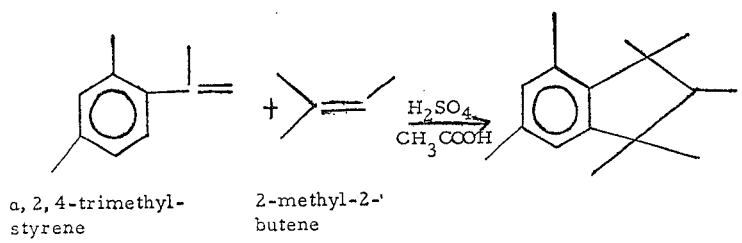

a,2,4-trimethyl-styrene    2-methyl-2-butene

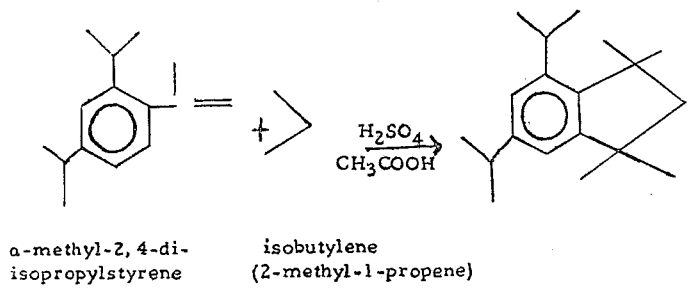

a-methyl-2,4-diisopropylstyrene    isobutylene (2-methyl-1-propene)

5. *Cyclo-addition of olefins to suitably substituted p-cymylcarbonium ions.*—Polyalkyl indans useful for the preparation of the herbicidally active acyl derivatives may be prepared as follows:

7. *Indans by cyclo-addition of 1, 3-butadienes to aromatic hydrocarbons.*—A one-step method for the preparation of polyalkylated indans was developed by the present inventors and is disclosed and claimed in our co-pending U.S. patent applications, Serial No. 107,023,

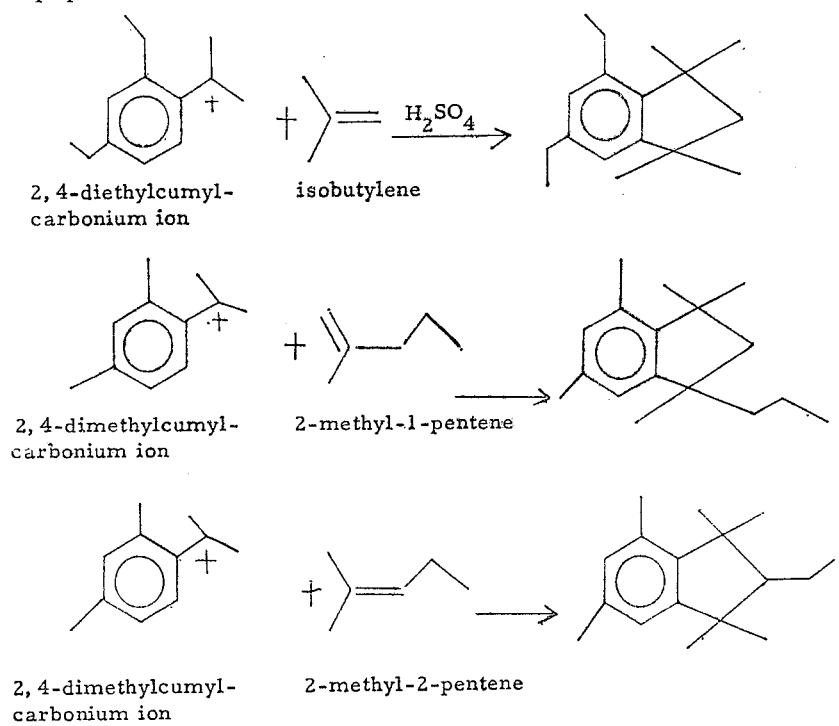

2,4-diethylcumyl-carbonium ion    isobutylene 2,4-dimethylcumyl-carbonium ion    2-methyl-1-pentene 2,4-dimethylcumyl-carbonium ion    2-methyl-2-pentene 6. *Hydrogenation of substituted indenes.*— filed May 2, 1961 and Serial No. 229,867, filed October

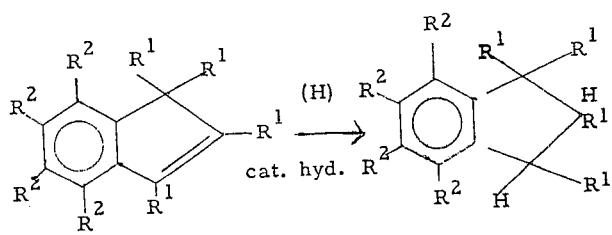

11, 1962. The latter application is a continuation application of Serial No. 65,261 and of Serial No. 65,290, both filed on October 27, 1960.

This novel reaction may be outlined as follows:

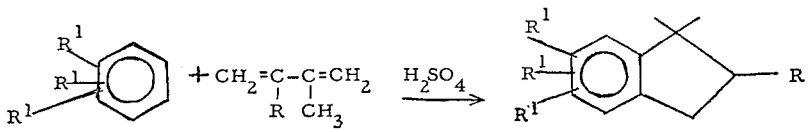

where $R = H$ or $CH_3$ and $R^1 = H$, alkyl radicals of 1 to 6 atoms, or cycloalkyl radicals.

The invention is further illustrated by the following examples, without, however, limiting it to them. All temperatures are in degrees centigrade. All melting points and boiling points are uncorrected.

*Example 1.—5,7-dinitro-1, 1-dimethyl-6-isopropylindan*

Into a rapidly stirred mixture of 308 g. of 93% sulfuric acid and 684 g. cumene at —5° there was slowly added dropwise a solution of 115 g. of isoprene in 200 g. cumene at such a rate that the reaction temperature could be maintained at —5 to 0° throughout the feed. Stirring was continued at 0° for 40 minutes after the feed was complete. After allowing to settle, the lower sulfuric acid layer was discarded and the remaining oil layer was washed successively with water, 5% caustic soda solution and 5% bicarbonate of soda solution. The washed solution was then subjected to vacuum-distillation, yielding, besides recovered cumene, 1, 1-dimethyl-6-isopropylindan as a colorless liquid, B.P. 75–77° (3 mm.), $n_D^{20}$ 1.5084, sp. gr. 25/25°=0.8986, amounting to 168 g. The vapor-phase chromatogram indicated a purity of greater than 95%.

This hydrocarbon (168 g.) was slowly added dropwise to mixed acid, prepared from 1000 g. of 93% sulfuric acid and 336 g. of 98% nitric acid with agitation and cooling to keep the temperature at 17 to 19° during the nitration. Crystals of the product separated during the nitration. The batch was then quenched on 1000 g. of ice-water. The crystalline product was filtered off and washed thoroughly with water. It was then dissolved in 600 ml. of benzol and the resulting solution washed successively with water, dilute caustic soda solution and again with water to neutrality. There remained 236 g. crude crystalline product after evaporation of the benzene. This was recrystallized from 2000 ml. of methyl alcohol at 5° to give 184 g. of pale yellow crystals, M.P. 124–125.2°.

*Analysis.*—Calcd. for $C_{14}H_{18}N_2O_4$: C, 60.42; H, 6.52; N, 10.07. Found: C, 60.04; H, 6.41; N, 10.03.

*Example 2.—5,7-diamino-1, 1-dimethyl-6-isopropylindan*

1,1-dimethyl-6-isopropyl-5, 7-dinitroindan (50 g.), suspended in 300 ml. of methanol, was hydrogenated in the presence of 1 g. of palladium on charcoal (5% moist) in a rocking autoclave at a temperature of 50° C. and a pressure of 50 lbs. of hydrogen. After 24 hours, the absorption of hydrogen (271 lbs.) stopped. Since raising the temperature to 80°, increasing the pressure to 60 lbs. and addition of 2 g. of new catalyst did not induce further absorption, the solution was filtered from the catalyst.

The filtrate was concentrated to a volume of 100 ml. by distillation in coarse vacuum. The concentrate was poured into 800 ml. of agitated water. A solid formed which was filtered, washed with water and dried at atmospheric pressure. Yield: 38.1 g. M.P.: 100–102°; color: brown.

The solid was recrystallized from 200 ml. of hexane in the presence of a small amount of Filtrol. Yield: 30.7 g.; M.P.: 101.5–102.5°; color: nearly white.

Analysis for $C_{14}H_{22}N_2$, calcd.: Percent C, 77.01; percent H, 10.16; percent N, 12.83. Found: Percent C, 77.23; percent H, 10.44; percent N, 12.97. M.W. 218.33.

*Example 3.—5-amino - 1,1 - dimethyl - 6 - isopropyl - 7-nitroindan or 7 - amino - 1,1 - dimethyl - 6 - isopropyl-5-nitroindan*

1,1-dimethyl-6-isopropyl-5,7-dinitroindan (50 g.) was suspended in 400 ml. of agitated methanol. Sodium sulfhydrate (NaHS·2H₂O, 27 g.) dissolved in 400 ml. of methanol was added over a period of 45 minutes. The temperature rose from 28 to 32° C.

The whole was agitated and refluxed for one hour. A brown solution, containing a fine solid, formed. About 300 ml. of methanol were removed by distillation in coarse vacuum.

The concentrate was poured into 3.5 l. of water. A turbid yellow solution formed which, on standing, separated a yellow solid. The solid was filtered, washed with water and dried at atmospheric pressure. Yield: 26.4 g.; color: orange. It was recrystallized from a mixture of 250 ml. of S.D. alcohol No. 30 and 50 ml. of water in the presence of 1 g. of Darco. Yield: 17.2 g.; M.P.: 106–110°; color: orange.

*Analysis* for $C_{14}H_{20}N_2O_2$, Calcd: percent C, 67.71; percent H, 8.12; percent N, 11.28. Found: percent C, 67.50; percent H, 8.57; percent N, 11.17. M.W. 248.32.

*Example 4.—5,6-dinitro-7-isopropyl-1,1,4-trimethylindan*

Into a vigorously-agitated suspension of 400 g. of 93% sulfuric acid and 1,000 g. p-cymene cooled to —2°, there was slowly added, dropwise, a solution of 150 g. isoprene in 200 g. p-cymene over a 4½ hr. period while the temperature was kept at —2 to 1°. Stirring was continued for 40 minutes after the feed. The mixture was allowed to settle and the lower sulfuric acid layer was separated and discarded. The remaining oil layer was washed successively with 200 ml. of water, 100 ml. of aqueous 5% caustic soda solution and 100 ml. of 5% aqueous sodium bicarbonate solution. The excess p-cymene was distilled off: (20 mm.) and the residual liquid distilled under high vacuum to yield as the main product a colorless liquid, B.P. 97–104° (2.2 mm.), $n_D^{20}$ 1.5161 to 1.5175, sp. gr. 25/25°=0.9188, amounting to 248 g. Upon careful refractionation the product boiled mainly at 99–100° (2.1 mm.). This hydrocarbon was shown to have the structure, 7-isopropyl-1,1,4-trimethylindan by study of the infrared and nuclear magnetic resonance spectra, its vapor-phase chromatogram. Final proof was its synthesis by an alternate method as follows:

completion of the hydrogenation the catalyst was removed by filtration. The alcohol was evaporated off

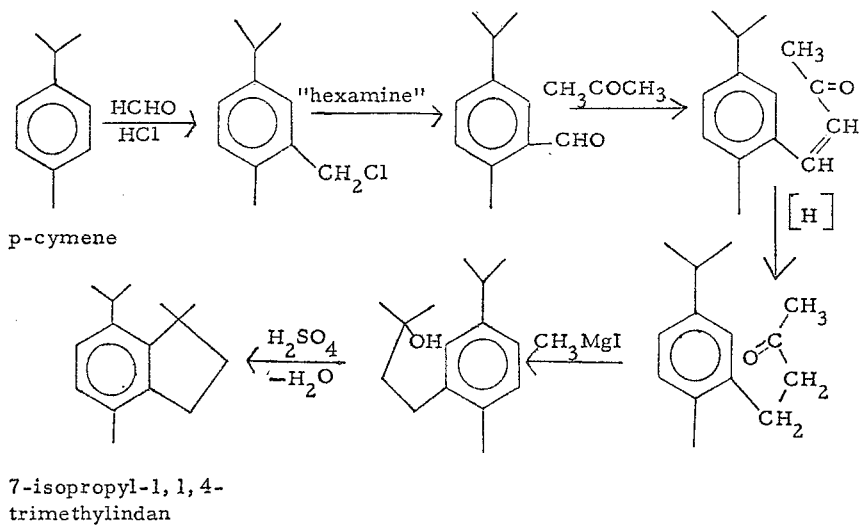

7-isopropyl-1,1,4-trimethylindan

Nitration of the hydrocarbon with mixed acid by the technique described above in Example 1, produced in good yield an odorless dinitro derivative, M.P. 151–152°.

*Analysis.*—Calcd. for $C_{15}H_{20}N_2O_4$: C, 61.70; H, 6.85; N, 9.58. Found: C, 62.00; H, 6.80; N, 9.52.

The acetyl derivative was prepared by acetylation in the presence of aluminum chloride using acetyl chloride. It was obtained as a colorless, odorless solid, M.P. 71–72.5°.

*Analysis.*—Calcd. for $C_{17}H_{24}O$: C, 83.60; H, 9.87. Found: C, 83.58; H, 9.69.

Example 5.—5,6-dinitro-7-isopropyl-1,1,2,4-tetramethylindan

Cyclo-addition of 2,3-dimethyl-1,3-butadiene to p-cymene was effected by the general method disclosed above in Examples 1 and 4. The resulting hydrocarbon, 7-isopropyl-1,1,2,4-tetramethylindan, was obtained as a colorless liquid, B.P. 98–100° (2 mm.), $n_D^{20}$ 1.5174, sp. gr. 25/25°=0.9206.

*Analysis.*—Calcd. for $C_{16}H_{24}$: C, 88.8; H, 11.1. Found: C, 89.03; H, 10.98.

Infrared and nuclear magnetic resonance spectra and the vapor-phase chromatogram indicate that the product has the structure noted above and its purity is higher than 90%.

The acetyl derivative, $C_{18}H_{26}O$, a white colorless solid, crystallized from methanol, melted at 55–56° and had a mild musk-like odor.

*Analysis.*—Calcd. for $C_{18}H_{26}O$: C, 83.70; H, 10.13. Found: C, 83.52; H, 9.99.

Nitration of the hydrocarbon with mixed acid by the technique described above in Example 1 produced in good yield a dinitro-derivative, pale yellow crystals, M.P. 126–127°.

*Analysis.*—Calcd. for $C_{16}H_{22}N_2O_4$: C, 62.71; H, 7.24; N, 9.14. Found: C, 62.75; H, 7.14; N, 9.12.

Example 6.—5,6-diamino-7-isopropyl-1,1,4-trimethylindan

Into the steel bottle of the Parr laboratory hydrogenator was charged 120 g. of ethanol, 5 g. of Raney nickel and 5 g. of 5,6-dinitro-7-isopropyl-1,1,4-trimethylindan (Example 4 above). Hydrogenation was effected at 72 to 74° using 50 p.s.i. hydrogen pressure. Nearly the theoretical amount of hydrogen was absorbed. Upon leaving a dark colored crystalline residue melting at 146 to 150°. The crude product exhibited herbicidal activity and was suitable for this use without further purification.

Example 7.—5,7-dinitro-1,1,4,6-tetramethylindan 1,1,4,6-tetramethylindan, produced by the cyclo-addition of isoprene to meta xylene in the presence of sulfuric acid using the molar ratios and operating conditions disclosed in Examples 1 and 4 above, was nitrated with mixed acid by the technique disclosed in Examples 1 and 4. A pale yellow, odorless, dinitroderivative, 5,7-dinitro - 1,1,4,6-tetramethylindan, was obtained, M.P. 92–93.5° (from methanol). This compound was active as a pre-emergence herbicide.

*Analysis.*—Calcd. for $C_{13}H_{16}N_2O_4$: C, 59.07; H, 6.09; N, 10.60. Found: C, 59.49; H, 5.99; N, 10.47.

Example 8.—5,6-dinitro-1,1,4,7-tetramethylindan 1,1,4,7-tetramethylindan, produced by the cyclo-addition of isoprene to para xylene in the presence of sulfuric acid using the molar ratios and operating conditions disclosed in Examples 1 and 4 above, was nitrated with mixed acid following the technique disclosed in Examples 1 and 4. A pale yellow, odorless, dinitroderivative, 5,6-dinitro-1,1,4,7-tetramethylindan, was obtained (96% by wgt.), M.P. 131.5–132.5° (from methanol). The compound was active as a pre-emergence herbicide.

*Analysis.*—Calcd. for $C_{13}H_{16}N_2O_4$: C, 59.08; H, 6.10; N, 10.60. Found: C, 59.48; H, 6.27; N, 10.34.

Example 9.—1,1-dimethyl-5,7-dinitro-6-ethylindan 1,1-dimethyl-6-ethylindan, made by the procedure of U.S. Patent 3,078,319, was nitrated with mixed acid, following the general procedure disclosed in Examples 1 and 4 above, to produce the pale yellow, odorless, dinitroderivative, 1,1-dimethyl-5,7-dinitro-6-ethylindan, M.P. 90–91°.

*Analysis.*—Calcd. for $C_{13}H_{16}N_2O_4$: C, 59.07; H, 6.09; N, 10.60. Found: C, 59.41; H, 6.06; N, 10.22.

This compound exhibited activity as a pre-emergence herbicide.

Example 10.—5,7-dinitro-1,1,2,4,6-pentamethylindan 1,1,2,4,6-pentamethylindan, produced by the cyclo-addition of 2,3-dimethyl-1,3-butadiene to meta xylene in the presence of sulfuric acid using the molar ratios and operating conditions disclosed in Examples 1 and 4 above, was nitrated with mixed acid, following the general nitration procedure disclosed above in Examples 1 and 4, to produce the colorless, odorless, dinitroderivative, 5,7-dinitro-1,1,2,4,6-pentamethylindan, M.P. 129.5–131°.

*Analysis.*—Calcd. for $C_{14}H_{18}N_2O_4$: C, 60.41; H, 6.52; N, 10.07. Found: C, 60.48; H, 6.39; N, 10.18.

This compound exhibited biological activity as a pre-emergence herbicide.

*Example 11.—6-t-butyl-1,1-dimethyl-5,7-dinitroindan*

6-t-butyl-1,1-dimethylindan, made by the procedure of U.S. Patent 3,078,319, was nitrated with mixed acid using the molar ratios and operating conditions of the general nitration procedures of Example 1 and 4 above, to produce the pale yellow, odorless, dinitroderivative, 6-t-butyl-1,1-dimethyl-5,7-dinitroindan, M.P. 174.5–175.5°.

*Analysis.*—Calcd. for $C_{15}H_{20}N_2O_4$: C, 61.61; H, 6.89; N, 9.58. Found: C, 61.71; H, 6.78; N, 9.45.

This compound was active as a pre-emergence herbicide.

*Example 12.—6-sec. butyl-1,1-dimethyl-5,7-dinitroindan*

6-sec. butyl-1,1-dimethylindan, made by the procedure of U.S. Patent 3,078,319, was nitrated with mixed acid using molar ratios and operating conditions as given above in Examples 1 and 4, to produce the pale yellow, odorless, dinitroderivative, 6-sec. butyl-1,1-dimethyl-5,7 - dinitroindan, M.P. 103–106°.

*Analysis.*—Calcd. for $C_{15}H_{20}N_2O_4$: C, 61.63; H, 6.90; N, 9.58. Found: C, 61.42; H, 7.02; N, 9.51.

The above compound was found to be effective as a pre-emergence herbicide.

*Example 13.—1,1-dimethyl-5,6-dinitro-4-ethyl-7-isopropylindan*

1,1-dimethyl-4-ethyl-7-isopropylindan, prepared by the cyclo-addition of isoprene to p-ethylcumene in the presence of sulfuric acid using the molar ratios and operating conditions disclosed in the first parts of Examples 1 and 4 above, was nitrated with mixed acid using the molar ratios and operating conditions as disclosed above in Examples 1 and 4, to produce the golden yellow, odorless, dinitroderivative, 1,1-dimethyl-5,6-dinitro-4-ethyl - 7 - isopropylindan, M.P. 167–168°.

*Analysis.*—Calcd. for $C_{16}H_{22}N_2O_4$: C, 62.38; H, 7.24; N, 9.14. Found: C, 62.94; H, 7.12; N, 9.11.

This compound is useful as a pre-emergence selective herbicide.

*Example 14.—4,6-diisopropyl-1,1-dimethyl-5,7-dinitroindan*

4,6-diisopropyl - 1,1 - dimethylindan, produced by the cyclo-addition of isoprene to m-diisopropylbenzene in the presence of sulfuric acid using the molar ratios and operating conditions as given in the first parts of Examples 1 and 4 above, was nitrated with mixed acid, as in the above examples, to produce the pale yellow, odorless, dinitroderivative, 4,6-diisopropyl-1,1-dimethyl-5,7-dinitroindan, M.P. 105–106°.

*Analysis.*—Calcd. for $C_{17}H_{24}N_2O_4$: C, 63.71; H, 7.58; N, 8.74. Found: C, 62.13; H, 6.89; N, 9.29.

The compound is useful as a pre-emergence herbicide.

*Example 15.—5-t-butyl-4,6-dinitro-1,1-dimethyl-7-isopropylindan*

5-t-butyl-1,1-dimethyl-7-isopropylindan, produced by the cyclo-addition of isoprene to p-t-butylcumene in the presence of sulfuric acid using molar ratios and operating conditions of the general procedure disclosed in the first part of Examples 1 and 4, was nitrated with mixed acid, as in the above examples, to produce a pale yellow, odorless, dinitroderivative, M.P. 187–204°.

This compound is effective as a selective pre-emergence herbicide.

*Example 16.—5-(and 7)-nitro-1,1,4,6-tetramethylindan*

1,1,4,6-tetramethylindan (26.1 g.) prepared as in Example 7, was added dropwise into a cold well-agitated solution of 72 g. glacial acetic acid, 61.2 g. acetic anhydride, and 24 g. of 98% nitric acid, which was kept at 0 to 4° during the addition. The reaction temperature was then allowed to rise to 15° and stirring was continued 1 hour longer at 15°. The batch was quenched in cold water. The oil which separated was taken up in benzene and washed successively with water (3 x 100 ml.), 5% sodium hydroxide solution (3 x 100 ml.) and again with water until neutral. Evaporation of the benzene left 32.2 g. of yellow oil (theory 32.3) which did not crystallize. This crude product can be used as a pre-emergence herbicide.

*Example 17.—1,1-dimethyl-6-isopropyl-5-(and 7) nitroindan*

1,1-dimethyl-6-isopropylindan (28.2 g.) made by the procedure of U.S. Patent 3,078,319, was mononitrated using the same nitrating mixture and conditions as employed in the preceding example. The work-up was exactly the same. The yield of crude yellow oil was 36 g. (theory=36 g.). This crude mixture was found to contain 77.3% of the 5-nitro-isomer by vapor-phase chromatography studies. The crude product is suitable for use as a pre-emergence herbicide.

*Example 18.—5-nitro-1,1,4,6,7-pentamethylindan*

1,1,4,6,7-pentamethylindan, M.P. 75–76°, made by the sulfuric acid-catalyzed cyclo-addition of isoprene to pseudocumene using the molar ratios and operating conditions as given in the first parts of Examples 1 and 4, was mononitrated using the acetic acid-acetic anhydride-nitric acid mixture as in the two preceding examples. The product (31.5 g.) (theory 31), was a pale yellow, odorless, viscous oil which could not be induced to crystallize. This crude liquid product is suitable, without further purification, as a selective pre-emergence herbicide.

*Example 19.—7-isopropyl-5-nitro-1,1,4-trimethylindan*

7-isopropyl-1,1,4-trimethylindan, prepared as described in Example 4, was nitrated, using the acetic acid-acetic anhydride-nitric acid mixture and operating conditions similar to those described in Example 16, to give the yellow, odorless, mononitro derivative, 7-isopropyl-5-nitro-1,1,4-trimethylindan, M.P. 115–116°.

*Analysis.*—Calcd. for $C_{15}H_{21}NO_2$: C, 72.84; H, 8.56; N, 5.66. Found: C, 72.57; H, 8.93; N, 5.52.

The nitro compound above is active as a pre-emergence herbicide.

*Example 20.—5-ethyl-6-nitro-1,1,3,3-tetramethylindan*

5-ethyl-1,1,3,3-tetramethylindan (S. H. Weber, J. Stofberg, D. B. Spoelstra and R. J. C. Kleipool, Rec. trav. chim., 75, 1441 (1956)) was nitrated, using the general method of Example 16, to produce the mono-nitro derivative, 5-ethyl-6-nitro-1,1,3,3-tetramethylindan, a pale yellow solid, M.P. 64.5–66.

*Analysis.*—Calcd. for $C_{15}H_{21}O_2N$: C, 72.84; H, 8.56; N, 5.66. Found: C, 72.52; H, 8.69; N, 5.64.

The product is useful as a selective pre-emergence herbicide.

*Example 21.—4,6-diisopropyl-1,1-dimethyl-5-nitroindan*

4,6-diisoproyl-1,1-dimethylindan, prepared as in Example 13, was mononitrated by the technique used in Example 16 to yield a derivative which was part oil and part crystalline. The crystalline portion was separated and purified by recrystallization from methanol yielding 4,6-diisopropyl-1,1-dimethyl-5-nitroindan, pale yellow, odorless crystals, M.P. 121.2–122°.

*Analysis.*—Calcd. for $C_{17}H_{25}NO_2$: C, 74.14; H, 9.15; N, 5.09. Found: C, 74.31; H, 9.10; N, 5.48.

This crystalline product, as well as the portion of the product, is active as a pre-emergence herbicide.

*Example 22.—4,6-dinitro-5-ethyl-1,1,3,3-tetramethylindan*

5-ethyl-1,1,3,3-tetramethylindan (S. H. Weber, J. Stofberg, D. B. Spoelstra, and R. J. C. Kleipool, Rec. trav. chim., 75, 1441 (1956)), was nitrated with mixed acid, using the molar ratios and operating conditions of Example 1, above, to produce the pale-yellow dinitroderivative 4,6 - dinitro - 5-ethyl - 1,1,3,3 - tetramethylindan, M.P. 123.5–124.5°, which has a strong musk-like odor.

*Analysis.*—Calcd. for $C_{15}H_{20}O_4N_2$: C, 61.63; H, 6.90; N, 9.58. Found: C, 61.85; H, 6.82; N, 9.42.

This product is useful as a pre-emergence herbicide.

*Example 23.—4,6-dinitro-2-ethyl-1,1,3,3,5-pentamethylindan*

2-ethyl - 1,1,3,3,5 - pentamethylindan, prepared by the procedure of Weber et al., Rec. trav. chim., 75, 1441 (1956), was nitrated with mixed acid, using the molar ratios and operating conditions of Example 1 above, to produce the pale-yellow dinitroderivative, 4,6-dinitro-2-ethyl-1,1,3,3,5-pentamethylindan, M.P. 80.0–81.5°, which has a musk-like odor.

*Analysis.*—Calcd. for $C_{15}H_{22}N_2O_4$: C, 62.38; H, 7.24; N, 9.14. Found: C, 62.20; H, 7.25; N, 8.89.

This product is useful as a pre-emergence herbicide.

*Example 24.—4,7-dinitro-6-ethyl-1,1,3,3,5-pentamethylindan*

6-ethyl-1,1,3,3,5-pentamethylindan, prepared by the procedure of Weber et al., Rec. trav. chim., 76, 199 (1957), was nitrated with mixed acid, using the molar ratios and operating conditions of Example 1 above, to produce the pale-yellow, odorless, dinitro-derivative, 4,7-dinitro-6-ethyl-1,1,3,3,5-pentamethylindan, M.P. 144.4–146°. The product is active as a plant growth regulant and pre-emergence herbicide.

*Example 25.—6-ethyl-4-(and 7-) nitro-1,1,3,3,5-pentamethylindan*

6-ethyl-1,1,3,3,5-pentamethylindan (Weber et al., loc. cit.) was nitrated by the procedure given in Example 16 to produce a pale-yellow viscous mononitro derivative which could not be induced to crystallize. This crude liquid product is useful, without further purification as a selective pre-emergence herbicide.

*Example 26.—6-cyclohexyl-1,1-dimethyl-5-7-dinitroindan*

Cyclo-addition of isoprene (2-methyl-1,3-butadiene) to cyclohexylbenzene in the presence of sulfuric acid was effected by the general method disclosed above in Examples 1 and 4, to produce 6-cyclohexyl-1,1-dimethyl-indan, a colorless liquid, B.P. 132° (2 mm.), $n_D^{20}$ 1.5311. This hydrocarbon was nitrated with mixed acid, using the molar ratios and operating conditions given in Examples 1 and 4 above, to produce the pale-yellow, nearly colorless, odorless dinitroderivative, 6-cyclohexyl-1,1-dimethyl-5,7-dinitroindan, M.P. 175–176°.

This product shows activity as a plant-growth regulant and pre-emergence herbicide.

The foregoing illustrates the practice of this invention, which however, is not to be limited thereby but is to be construed as broadly as permissible in view of the prior art and limited solely by the appended claims.

We claim:
1. A member selected from the group consisting of:
   (a) a compound coming within the scope of the following general formula:

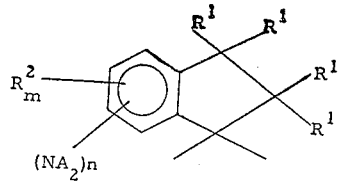

wherein $R^1$ is a member selected from the group consisting of H, and alkyl radicals having from 1 to 3 carbon atoms; $R^2$ is a member selected from the group consisting of alkyl radicals having from 1 to 5 carbon atoms and cycloalkyl radicals; A is a member selected from the group consisting of O and H with the proviso that at least one A must be O; $m$ is an integer from 2 to 3; $n$ is an integer from 1 to 2, the sum of $m+n$ not exceeding 4, with the proviso that at least one $R^1$ must be H and the further proviso that where more than two of the $R^1$'s are H, then $m$ can be an integer from 1 to 3;
   (b) 4,6-dinitro-2-ethyl-1,1,3,3,5-pentamethylindan and
   (c) 4,6-dinitro-5-ethyl-1,1,3,3-tetramethylindan.
2. 5,7-dinitro-1,1,4,6-tetramethylindan.
3. 4,6-dinitro-2-ethyl-1,1,3,3,5-pentamethylindan.
4. 4,6-dinitro-5-ethyl-1,1,3,3-tetramethylindan.
5. 1,1-dimethyl-5,7-dinitro-6-isopropylindan.
6. 4,6-diisopropyl-1,1-dimethyl-5,7-dinitroindan.

References Cited by the Examiner

Grampoloff, Helva, Chem. Acta, vol. 38, pages 1263–1268 (1955).

Kolodkina et al., Chem. Abs., vol. 59, pages 5083–5084 (1963).

Barnes et al., J. Am. Chem. Soc., vol. 74, pages 4199–4200 (1952).

BENJAMIN R. PADGETT, *Acting Primary Examiner.*

REUBEN EPSTEIN, LEON D. ROSDOL, *Examiners.*

L. A. SEBASTIAN, *Assistant Examiner.*

UNITED STATES PATENT OFFICE
CERTIFICATE OF CORRECTION

Patent No. 3,283,016                    November 1, 1966

Thomas F. Wood et al.

It is hereby certified that error appears in the above numbered patent requiring correction and that the said Letters Patent should read as corrected below.

Columns 3 and 4, lines 11 to 21, the left-hand portion of the formula should appear as shown below instead of as in the patent:

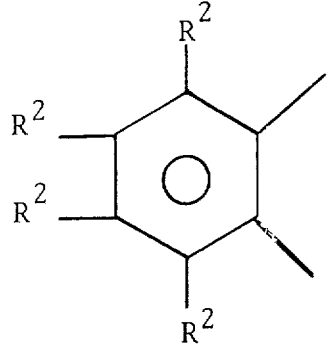

column 10, line 54, for "1,1,1,4,7" read -- 1,1,4,7 --; column 13, line 1, for "portion" read -- oily portion --; line 25, for "$C_{15}$" read -- $C_{16}$ --; column 14, line 30, for "A must be 0" read -- A must be O --.

Signed and sealed this 24th day of October 1967.

(SEAL)
Attest:

EDWARD M. FLETCHER, JR.                    EDWARD J. BRENNER
Attesting Officer                           Commissioner of Patents